March 31, 1964 R. LEHMANN 3,127,180

RECORD CHANGERS

Filed Dec. 2, 1960 3 Sheets-Sheet 1

INVENTOR

RUEDIGER LEHMANN

By: Otto John Munz

March 31, 1964 R. LEHMANN 3,127,180

RECORD CHANGERS

Filed Dec. 2, 1960 3 Sheets-Sheet 2

INVENTOR

RUEDIGER LEHMANN

BY: Otto John Munz.

March 31, 1964 R. LEHMANN 3,127,180

RECORD CHANGERS

Filed Dec. 2, 1960 3 Sheets-Sheet 3

INVENTOR

RUEDIGER LEHMANN

By: Otto John Munz

United States Patent Office 3,127,180
Patented Mar. 31, 1964

3,127,180

RECORD CHANGERS

Ruediger Lehmann, Sankt Georgen, Black Forest, Germany, assignor to Oskar Steidinger and Siegfried Steidinger, trading as the firm Gebrueder Steidinger K.G.

Filed Dec. 2, 1960, Ser. No. 73,274
Claims priority, application Germany Dec. 15, 1959
9 Claims. (Cl. 274—15)

The invention concerns a device in a universal record-changer for controlling the introduction of a pickup-arm into the run-in groove of a record.

A universal record-changer lowers records of various sizes from a supply stack onto the turn-table, and has a sensing member which senses the size of the record and which influences the pivotal gearing of the drive of the pick-up arm which member is guided from the outside inwardly towards the edge of the record.

It is usually desired to be able to use a record-playing apparatus, as a record-changer or, on the other hand, as a record-player, i.e. to be able to place one record onto the turn-table without having to use the record lowering mechanism. Even in this case the pick-up should be able to be guided automatically into the run-in groove of the record.

The invention seeks to provide a simple solution of this problem. Moreover, the lowering of the pick-up arm should be positively controlled on to the record in order to ensure a reliable and smooth engagement with the record.

A further purpose of the invention is to achieve an automatic change-over of the device from record-changer method of playing to automatic record player operation.

The invention will be described further, by way of example, with reference to the accompanying drawings in which.

Figure 1:
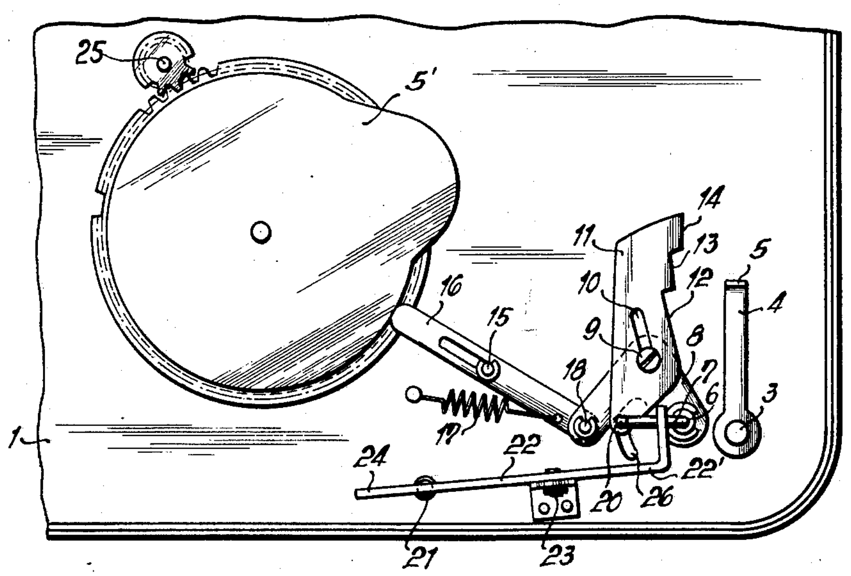
FIG. 1 shows a partial elevation of a record-changer from below.
Figure 2:
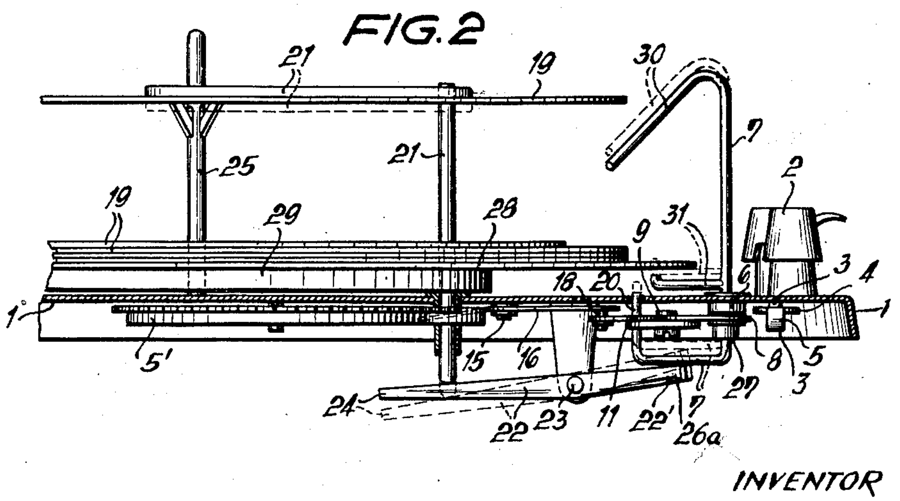
FIG. 2 shows a partial elevation of the record changer of FIG. 1 viewed from the front.

Referring to FIGS. 1 and 2 a pick-up arm 2 is pivotally mounted about a vertical pivot 3 on a base-plate or panel 1. A lever 4 is rigidly attached on the pivot 3 below panel 1, which lever is bent away at its distal end to form an abutment or stop 5. The lever 4 is (in a manner known in itself and not shown) driven from the changing mechanism 5' of the apparatus by way of a frictional coupling for pivoting the pick-up or tone arm 2. The vertical movement of the pick-up arm 2 is controlled (in a manner likewise known and not shown) by the changing mechanism 5'. A sensing member 7 is mounted in a bush 6 fixed to the apparatus for pivotal and vertical sliding movement therein. A bellcrank 8 which carries a pivot 9 is also mounted so as to be rotatable about bush 6. An abutment arm 11, has stepped abutments 12, 13, 14 corresponding to the record sizes. This arm has pivotal connection with a lower portion 20 of sensing member 7, and has a slot 10 which slidably receives pivot 9 so as to be displaceable against weak friction. A slider 16 guided by a pivot 15 fixed to panel 1 is, on the one hand, urged by means of a spring 17 against a control cam of the changing mechanism 5' and, on the other hand, is coupled by pivot 18 to the free end of bellcrank 8. FIGS. 1 and 2 show the sensing member in the position during the changing period in which it is ready to sense a falling record.

If a record 19 from the storage stack drops on to the turn-table 29, it swings the sensing member 7 in a counter-clockwise direction (in FIG. 1) on its downward path to an extent which depends on the record size whereby the sensing member 7 displaces with its lower end 20 the abutment arm 11 relative to the pivot 9 and brings one of the abutments 12, 13, 14 into the pivotal path of abutment 5 of lever 4. If the pick-up arm 2 is swung counter-clockwise with reference to FIG. 1, until abutment 5 engages one of the abutments 12, 13 and 14 and by means of a known displacement mechanism (not shown) is lowered into the run-in groove of the record, the control cam of the changing mechanism 5' has meanwhile actuated the slider 16 so that this swings away the crank 8 in a counter-clockwise direction and thereby pivots the abutment arm 11 free of abutment 5, thus enabling the tone arm to enter the sound grooves. At the same time the sensing member 7 is swung by bellcrank 8 into an inoperative position outside the largest record diameter and by abutment of its lower end 20 which is free to move in a slot 26 of panel 1 the abutment arm 11 is again brought into its initial position relative to bellcrank 8. If the highest point of the control cam of the changer mechanism 5' has actuated the slider 16 the operation period of the changing mechanism is completed. By putting the changing mechanism 5' into action again at the end of playing one record the sensing device consisting of crank 8, abutment arm 11 and sensing member 7 is swung in by means of the slider 16 again into its ready position for sensing the record which is now dropping.

If the last record of the supply stack has dropped, a record stabilising arm 21 guided vertically in panel 1 reaches a lever 22, and swings it about its axis 23. The lever, in known manner (not shown) by means of its free end 24 actuates the switching off of the apparatus. It can be actuated instead, for example, by a load arm or by a record release shaft with associated switching-off mechanism. The end 26*a* of lever 22 raises the sensing member 7 until this sensing member comes into abutment with the lower edge 27 of the bush 6. With this the lower sensing arm 31 of the sensing member 7 is raised up to the height of the record 28 (the position shown in chain-dotted lines) disposed directly on the turn-table 29. For this purpose only a relatively small vertical displacement movement of the sensing member is necessary. In the absence of a load arm or such-like device, which when the record supply stack is exhausted, releases an adjustment, the raising of the sensing member 7 can also take place by means of an operating lever arranged on the base panel.

If the apparatus is put in operation after a record has been placed by hand on the turn-table without assistance of the throw-off mechanism, the slider 16 is again actuated by the control cam of the changing mechanism 5' and swings the sensing member counterclockwise. The slider 16, however, drives the abutment arm 11 in its path and the sensing member 7 coupled thereto until the sensing arm 31 of the sensing member 7 has reached the edge of the record. The abutment 12, 13, 14, corresponding to the size of the record, is therewith brought into the pivotal path of the abutment 5 connected to the pick-up arm. Towards the end of the operating period of the changing mechanism 5', whereby the pick-up arm is lowered on to the record, its control cam again brings the sensing device into the outward inoperative position.

Figure 3:
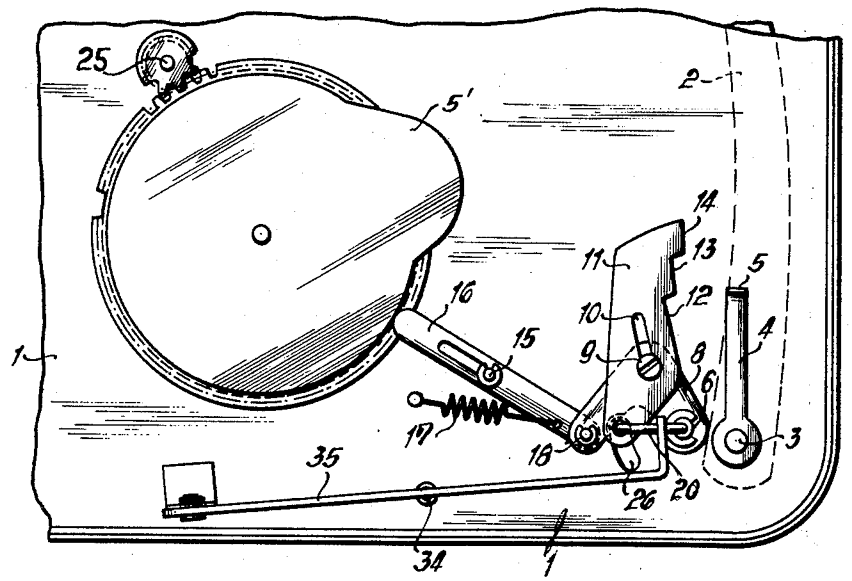
FIGS. 3 and 4 show a modification of the embodiment illustrated in FIGS. 1 and 2.
Figure 4:
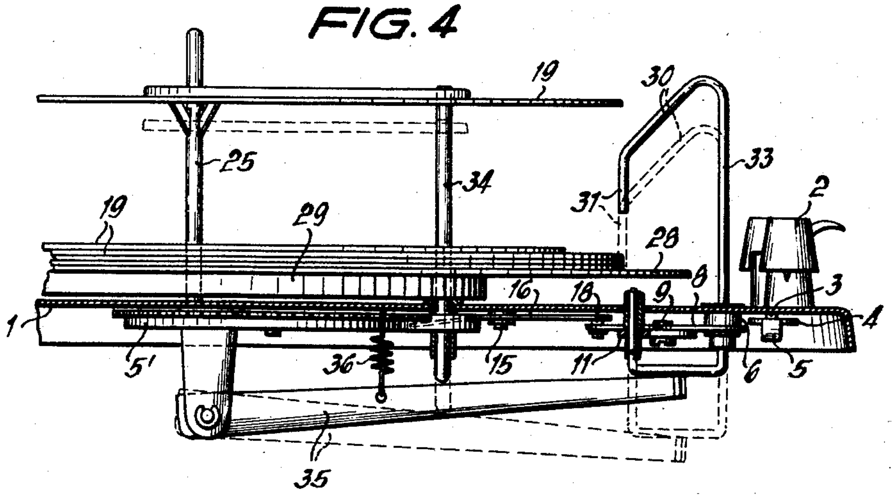

The embodiment of FIGS. 3 and 4 differs from that of FIGS. 1 and 2 only in that the lower arm 31 of the sensing member 7 is formed by prolongation of the upper sensing arm 30. The thus formed sensing member 33 is as a result of the changing over of the record-changer to record-player operation moved (chain-dotted position) from the upper to the lower record sensing range.

With automatic change-over of the sensing member 33 with the record stabilising arm 34 movement must occur in the same direction contrary to the example shown in FIGS. 1 and 2. For this purpose the lever 35 is constructed with a single arm and is drawn by means of a spring 36 so strongly against the sensing member 33 that its own weight is lifted directly. All other parts have the method of operation as described with reference to FIGS. 1 and 2.

Figure 5:
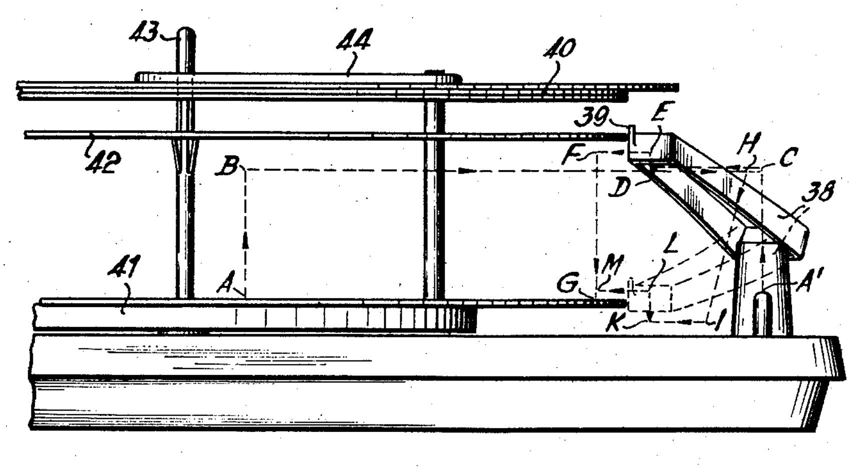
FIG. 5 shows as a further embodiment of the invention the partial elevation of a record-changer from the front.

As shown in FIG. 5 the pick-up arm 38 itself carries the sensing member 39. For the purpose of changer operation the record 42 dropping from the supply stack 40 on to the turn-table 41 is temporarily held by means of the shaft 43 in an intermediate position. The mechanism of the record-changer guides the pick-up arm 38 in one operating cycle, as shown in the chain-dotted line A to G, or with the first record A'—C to G. If no supply records are disposed on the shaft 43, the record stabilising arm 44 stays in a position, whereby the apparatus is ready for switching off. In this position the control means for the vertical movement of the pick-up arm is set at the same time in such a way that when the apparatus starts after a record has been placed by hand on the turntable, the pick-up arm is lowered during its movement along the line C—E additionally from H to J, whereby the movements A'—C—H—J—K—I—M—G occur. The return of the pick-up arm, after the end of the playing, to the rest support, in this case, occurs in the same manner as after the end of playing the last record of a supply stack, i.e. by inhibiting the return pivoting of the pick-up arm by means of the cut-off mechanism.

I claim:

1. In a record-changing apparatus for a phonograph having a base, a turntable journaled on said base for rotation about a normally vertical axis, and a tone arm mounted on said base for pivoting about a second normally vertical axis, over and across said turntable, said tone arm having a stop fixed therewith in radially offset relation from said second axis, a sensing member mounted on said base for pivoting about a third vertical axis and engaged by and pivoted by the periphery of a record dropped onto said turntable, through an angle proportional to the radial dimension of said record, stepped abutment means movably mounted on said base and connected with said sensing member to be moved by pivoting thereof to a position wherein the step of said abutment means corresponding to the radial dimension of said record is moved into the path of said stop to thereby engage the same and limit the swing of said tone arm inwardly toward said first axis in accordance with said radial dimension.

2. In a record-changing apparatus for a phonograph having a base, a turntable journaled in said base for rotation about a first normally vertical axis and a tone arm having one end pivoted on said base on a second normally vertical axis for movement of its other end toward and from said first axis, a stop fixed with said tone arm in radially offset relation with said second axis, a sensing member including a vertical body portion, means mounting said body portion to said base for pivoting about a third normally vertical axis, the upper end of said sensing member extending inwardly toward said first axis, and downwardly, to be engaged and rotated about said third axis by, and in proportion to the radius of a record dropped onto said turntable, an abutment arm movably mounted on said base in the path of said tone arm stop, and means connecting said sensing member directly with said abutment arm to move said abutment arm by and in proportion to pivotal movement of said sensing member, to thereby limit pivoting of said tone arm toward said first axis in accordance with the radial dimension of said record.

3. A record-changing apparatus for a phonograph having a base, a power-driven turntable mounted on said base for rotation about a vertical first axis, and a tone arm pivoted at one end on said base for rotation about a second vertical axis for movement of its other end toward and from said first axis, a stop fixed with said tone arm in radially offset relation from said second axis, a sensing member including a straight vertical body portion, means mounting said body portion on said base for rotation about a third vertical axis adjacent to said second axis, a bellcrank having one end pivoted on said third axis, an abutment arm having a stepped edge and mounted for sliding pivotal movement on and between the ends of said bellcrank to move any one of the steps on said edge into the path of said tone arm stop, and a first crank arm fixed with the lower end of said sensing member and pivotally connected with and translating said abutment arm by and in proportion to pivotal movement of said sensing member about said third axis.

4. The apparatus of claim 2, a cam member driven from said turntable, a slide mounted on said base for longitudinal translation radially of said first axis in position with one end in contact with said cam member, a pivotal connection between the other ends of said slide and bellcrank, translation of said slide by said cam member pivoting said bellcrank and thereby moving said abutment arm free of the path of said tone arm stop, and means yieldingly urging said slide toward and into contact with said cam member.

5. The apparatus of claim 4, said bellcrank pivoting in response to translation of said slide, engaging said crank arm to thereby pivot said sensing member clear of a record on said turntable.

6. The apparatus of claim 5, said sensing member being translatable along said third axis and having a second arm with an end offset along said third axis, and means responsive to dropping of the final one of a stack of records onto said turntable to effect vertical translation of said sensing member to raise said offset end to the level of the lowermost record on said turntable, for engagement therewith.

7. In a record changer for a phonograph including a base plate, a turntable journaled for rotation on said plate about a first vertical axis, and a tone arm pivoted to said plate on a second axis for traversing said turntable in playing of a record thereon, said tone arm having a stop fixed therewith, a sensing member including a straight rod-like body portion, means mounting said body portion on said plate for pivoting about and translation along a vertical third axis outside the periphery of said turntable, said sensing member including an upper end directed inwardly and downwardly toward said turntable to be engaged and pivoted about said third axis by the periphery of a record dropped onto said turntable, said sensing member also including a first arm at the lower end of said body portion and extending radially of, and terminating in a crank offset from and parallel with said third axis, a bellcrank having one end mounted for pivoting about said third axis, an abutment lever having a stepped edge, means mounting said abutment lever on said bellcrank for pivotal sliding movement about and transversely of a fourth vertical axis offset from said third axis, and a pivotal connection between said crank and abutment lever, said abutment lever being translated on and with respect to said bellcrank to move any one of the steps thereof into the path of the stop on said tone arm by and in proportion to the pivotal movement of said sensing member about said third axis.

8. A record-changing apparatus for a phonograph having a base, a turntable rotatable on said base about a first vertical axis, and a tone arm pivoted at one end to said base on a second vertical axis for movement of its other end toward and from said first axis, over a record on said turntable, said tone arm having a stop fixed therewith below said base and radially offset from said second axis, a sensing member including a straight vertical body portion, a bushing mounting said body portion to said base for rotation about a third vertical axis between said first and second axes and for limited translation along said third axis, the upper end of said sensing member extending inwardly toward said first axis, and downwardly, to be engaged by the peripheral edge of a record dropping onto said turntable, and rotated thereby in proportion to the radial size of said record, a bellcrank pivoted at one end on said bushing for rotation about said third axis below said base, a pivot pin fixed to said bellcrank between the ends thereof, an abutment arm mounted on said pivot pin for pivotal sliding movement with respect thereto, said abutment arm having a stepped edge in the path of said stop, said sensing member including a crank arm integral therewith below said base and pivotally connected with said abutment arm in offset relation with said pivot pin, pivoting of said sensing member, as aforesaid, sliding said abutment arm on said bellcrank to bring a step thereof into the path of said stop in dependence upon the angle of pivoting of said sensing member, a slide mounted on said base for longitudinal translation radially of said first axis, a pivotal connection between the other end of said bellcrank and the adjacent end of said slide, translation of said slide from a first to a second position, pivoting said bellcrank and pivotally retracting said abutment arm clear of said stop, said bellcrank, in response to pivoting by said slide also engaging said crank arm and thereby pivoting said sensing member clear of records on said turntable, means translating said slide from first to second positions on completion of playing of a record on said turntable, and means yieldingly urging said slide to first position.

9. The apparatus of claim 8, said sensing member including a second arm above said base, radially of said third axis, said arm having an upwardly-turned end normally below the level of the lowermost record on said turntable, and means responsive to dropping of the final one of a stack of records onto said turntable to vertically elevate said sensing member and bring said upwardly-turned end into the plane of the lowermost record on said turntable, for engagement with the periphery thereof.

References Cited in the file of this patent

UNITED STATES PATENTS

| | | |
|---|---|---|
| 2,637,558 | Fisher | May 5, 1953 |
| 2,818,263 | Dale | Dec. 31, 1957 |
| 2,868,547 | Vistain | Jan. 13, 1959 |
| 2,989,313 | Hansen | June 20, 1961 |